INVENTOR.
WILLIAM SICHAK
BY
Hopgood & Calimafde
ATTORNEYS.

Nov. 25, 1969 W. SICHAK 3,480,867

ADAPTIVE RECEIVER SYSTEM FOR MINIMIZING PATH INTERMODULATION NOISE

Filed Oct. 14, 1965 2 Sheets-Sheet 2

INVENTOR.
WILLIAM SICHAK

BY

Hopgood & Calimafde
ATTORNEYS.

United States Patent Office 3,480,867

Patented Nov. 25, 1969

3,480,867
ADAPTIVE RECEIVER SYSTEM FOR MINIMIZING PATH INTERMODULATION NOISE

William Sichak, Nutley, N.J., assignor to Communication Systems, Incorporated, Carson City, Nev., a corporation of Nevada Filed Oct. 14, 1965, Ser. No. 496,120
Int. Cl. H04b *1/10*
U.S. Cl. 325—476 12 Claims

ABSTRACT OF THE DISCLOSURE

A method and device for minimizing path intermodulation noise wherein the incoming signal is divided into two parts, one part of which is delayed and attenuated until it approximates the undesired signals. The delayed and attenuated signal is then recombined with the received signal to as to cancel the undesired portions of the received signal. This is accomplished by dividing the incoming signal and sending a portion thereof to variable delay means and variable attenuation means wherein separate identification signals are impressed upon the incoming signal. After the incoming signal and the delayed signal are combined, the identifying signals are detected and any phase change therein employed to adjust the variable delay and attenuation means so that said delayed and attenuated signal will most closely approximate the unwanted incoming signals and cancel the same when combined with the incoming signal.

This invention relates to a receiver system for reducing intermodulation noise developed during signal transmission.

More particularly, this invention relates to an adaptive system for minimizing multipath distortions and the intermodulation noise that results.

An object of the invention is to provide a simple system for reducing intermodulation noise in a receiver.

A further object of this invention is to provide a system for reducing receiver intermodulation noise in which corrections are made at the receiver without sending any signals to or varying the output from the transmitter.

Briefly, in my invention I utilize the principle that, ordinarily, intermodulation in a transmission system due to multipath reflections may be approximated and considered as if produced by a single time-varying reflection or echo. In the preferred embodiment of my invention, using an FM troposcatter system for illustration, the received signal is applied over a main branch and a portion of the received signal is applied over an auxiliary branch comprising a variable delay line and a variable attenuator. The auxiliary branch is thereafter reconnected with the main branch to combine the branch signals. A delay sensor determines whether the setting of the variable delay line should be changed and, if so, in what direction. A magnitude sensor operates similarly on the amplitude of the delayed sample.

By varying the delay and attenuation in the auxiliary branch over a small range in a predetermined and well known manner, the auxiliary branch signal can be modified to approximate the single echo. The single time varying approximation constituting the auxiliary branch signal varies with time as does the echo; compensation is thus dependent on the correct setting of the delay and attenuation. The branch signal is combined with the received signal (echo) so as to essentially cancel the distortion.

In HF, the "echo" is often very close in magnitude to the "main" or "direct" signal and two or more echoes may be present. There may often be deep selective fading within the transmitted bandwidth. Prior attempts to eliminate intermodulation distortion have unsuccessfully encountered these problems.

In my invention, during successful operation, the main signal is considerably stronger than the equivalent echo. When the magnitude of the echo is close to that of the main signal, intermodulation distortion will exist; however, it is reduced when the strength of the main signal increases. So long as deep selective fading within the transmitted bandwidth does not often occur, my invention will be useful in reducing intermodulation distortion.

All of the objects, features and advantages of this invention and the manner of attaining them will become more apparent and the invention itself will be best understood by reference to the following description of an embodiment of the invention taken in conjunction with the accompanying drawings, in which.

Figure 4:
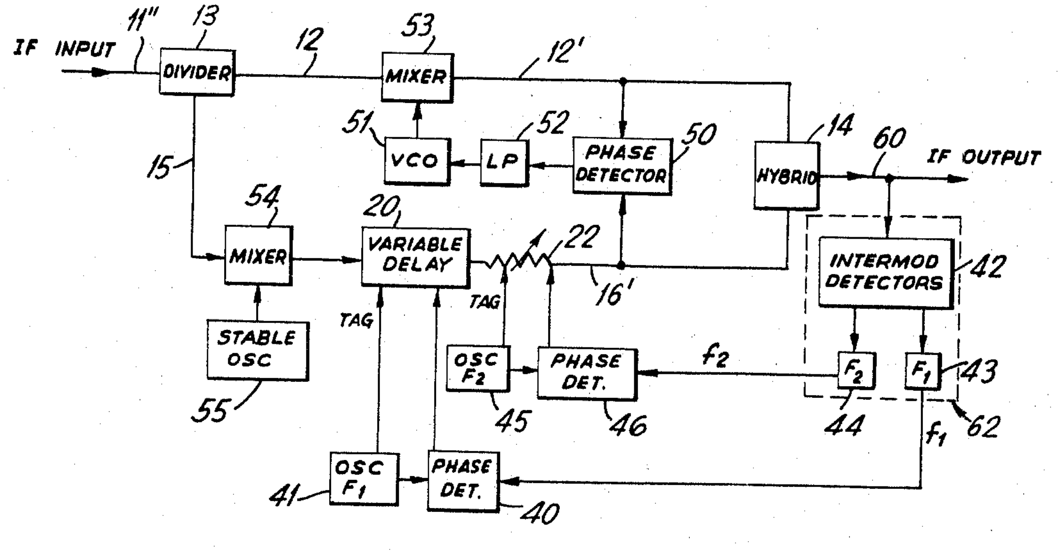

FIGS. 3*a–d* are diagrams of the wave forms illustrating variations in delay with time under different conditions;

FIG. 4 is a block diagram of an alternative preferred embodiment; and

Figure 5:
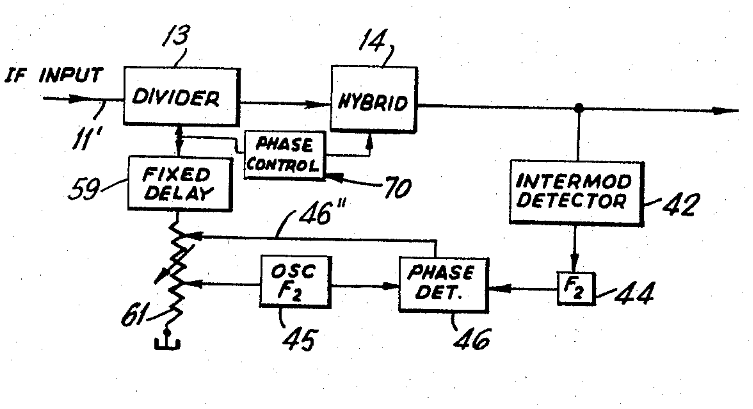

FIG. 5 is a block diagram of another embodiment of my invention.

In the foregoing discussion, reference will be made to an FM system in a troposcatter distortion medium; such system and medium are only exemplary.

Figure 1:
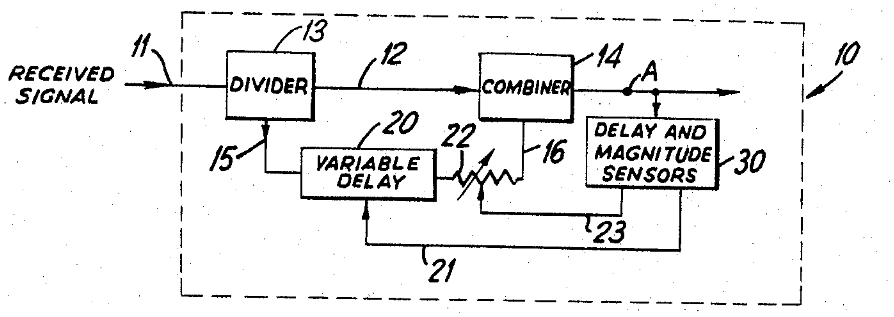
FIG. 1 is a simplified block diagram of my invention.

Referring now to FIG. 1, there is shown a receiver 10 having an input 11 from an antenna (not shown). The input signal is applied to branch circuits 12 and 15 from divider 13, such as, a hybrid device or T. The auxiliary branch circuit 15 develops the compensating signal which is a replica of the approximated echo.

In this simplified representation, the branch line 15 applies the input signal to variable delay means 20 and variable attenuating means 22. Sensing means 30 is coupled to the output of combiner 14 and applies control signals over lines 21 and 23 to vary the amounts of delay and attenuation.

In an actual troposcatter system, the equivalent echo amplitude and delay vary with time, but at a rate which is slow (in the approximate range of 0.1 to 10 c.p.s.) compared to the minimum modulating frequencies of interest.

Automatic control means are used to vary the average delay setting and the average attenuation setting so that each is always at or near the proper value. The delay and attenuations are caused to vary to compensate for the time-varying echo. As will be shown later, the delay and attenuation effects may be identified in the output signal.

Since the operation of this invention depends on the validity of the single time-varying echo as an approximation of intermodulation distortion, a brief review of the applicable theory will help to clarify and understand the desired variation of the parameters of this system.

For clarity the case of only one modulation frequency will be treated here, but a general solution applicable to multichannel telephony or other forms of signal transmission, gives the same result.

The direct signal is $$\sin (wt+m \sin pt) \quad (1)$$

$w=2\pi$ times the radio or intermediate frequency
$t$=time
$m$=modulation index
$p=2\pi$ times the modulating frequency The echo is $$a \sin [w(t-T)+m \sin p(t-T)] \quad (2)$$

$a$=amplitude of echo relative to the direct signal
T=echo time delay

The received signal is the sum of the direct and echo signals $$A \sin (wt+m \sin pt+\text{arc} \tan X) \quad (3)$$

A=resultant amplitude $$X=a \sin [-wT+m \sin p(t-T)-m \sin pt] \quad (4)$$

$$\overline{1+a \cos [-wT+m \sin p(t-T)-m \sin pt]}$$
$$=\frac{-a \sin [wT+2m \sin (pT/2) \cos (pt-pT/2)]}{1+a \cos [wT+2m \sin (pT/2) \cos (pt-pT/2)]} \quad (5)$$

For the case of interest here $a$ and $m$ are small compared to unity. Further, the intermodulation is a maximum when $wT$ is an odd multiple of $\pi/2$. Therefore, $$\text{arc} \tan X \approx X \approx -a \cos [2m \sin (pT/2) \cos (pt-pT/2)]$$
$$\approx -a+2am^2 \sin^2 (pT/2) \cos^2 (pt-pT/2)- \ldots$$
$$\approx am^2 \sin^2 (pt/2) \cos (2pt-pT) \quad (6)$$

In the last expression only the term which varies with time has been retained, since the other term represents only a phase shift at the radio frequency.

Equation 3 now becomes $$A \sin [wt+m \sin pt+am^2 \sin^2 (pT/2) \cos (2pt-pT)] \quad (7)$$

The second term in the parenthesis is the transmitted desired modulation, and the third term is the unwanted intermodulation at twice the modulating frequency.

If a part $b$ (appearing over branch 15) of the distorted wave represented by (7) having an echo time delay $T_1$ is delayed an amount $T_2$, reversed in phase and added to the distorted signal, the result is $$B \sin [(wt+m \sin pt+\overbrace{am^2 \sin^2 (pT_1/2) \cos (2pt-pT_1)}^{P} - \underbrace{bm^2 \sin^2 (pT_2/2) \cos (2pt-pT_2)}_{Q}] \quad (8)$$

The combiner 14 may invert and hence reverse the phase of the branch signal before adding it to the main signal, as illustrated in FIG. 1.

In (8), all terms containing factors of $a^2$, $b^2$, $ab$, etc. have been omitted because their magnitudes are small compared to $a$, $b$. To cancel most of the intermodulation it is necessary that $$a=b$$
$$T_1=T_2 \quad (9)$$

so that the expressions P and Q cancel out.

If $pT_1/2$ and $pT_2/2$ are both small compared to unity, so that $\sin (pT_1/2) \approx pT_1/2$, approximate cancellation can be obtained by setting $aT_1^2=bT_2^2$. The cancellation may be adequate if $T_1$ does not differ too much from $T_2$.

Further, $wT$ above, set equal to an odd multiple of $\pi/2$, to show the worst case, will vary with time.

Figure 2:
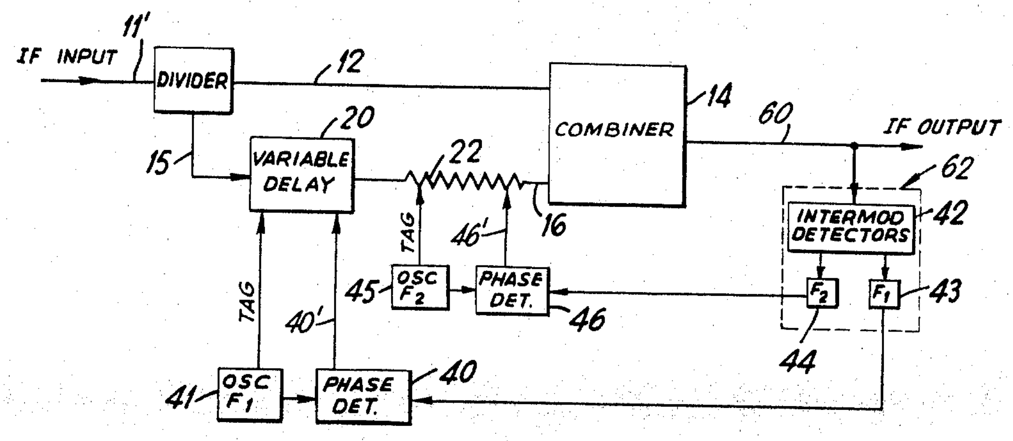
FIG. 2 is a block diagram of an embodiment of my invention.

In the embodiment of FIG. 2 the input signal 11′ from the receiving antenna at the transmission frequency or on its intermediate frequency, IF, is applied over lines 12 and 15.

The auxiliary branch comprises variable delay means 20 and variable attenuating means 22 in series. The output from attenuating means 22 is applied over line 16 to the combiner 14. The output from combiner 14 is applied over line 60 to the utilization means as well as to a control circuit operable to selectively vary the delay and attenuating means.

The control circuit comprises an oscillator 41 which imposes a tag signal or identifying modulation (preferably frequency) at frequency $F_1$ to the auxiliary signal. The tag signal as indicated is applied to vary the delay 20.

Another tag oscillator 45 imposes a similar tag signal or identifying modulation but at a frequency $F_2$ to the auxiliary signal but after the delay 20 and to vary the attenuating means 22. The modulation index produced by either oscillator 41 or oscillator 45 is small compared to the modulation of the intelligence bearing received signal.

The tag signals $F_1$ and $F_2$ are applied to detectors 40 and 46 respectively, which may be phase detectors, which exert a control upon the delay and attenuating means 20 and 22 over lines 40′ and 46′ respectively.

In the combiner 14, the main signal is added with the signal in the auxiliary branch. Since the auxiliary branch signal represents an approximation to the undesired intermodulation component of the main signal, the auxiliary signal must be phase reversed. Although I have termed the combiner as a device for adding signals, it will be clear that subtraction can occur when the signal is phase reversed. Such phase reversal may be accomplished within the scope of the combining means in accordance with the skill of the art.

The signal applied from branch 15 via line 16 to combiner 14 is continuously variable in amplitude and delay and phase reversed so that the conditions of Equation 9 requiring $P \cong Q$ are essentially satisfied or closely approximated.

The frequencies $F_1$ and $F_2$ are chosen to be enough higher than the time rate of change of the path delay so that the effects of path delay can be detected unambiguously. For some applications, such as telephony, it may be desirable to use a random noise generator with a filtered output because low level tones are more noticeable than noise of the same level.

A sensing means 62 senses the value or amount of delay and attenuation by determining the components of identifying modulation components at frequencies $F_1$ or $F_2$.

Figure 3:
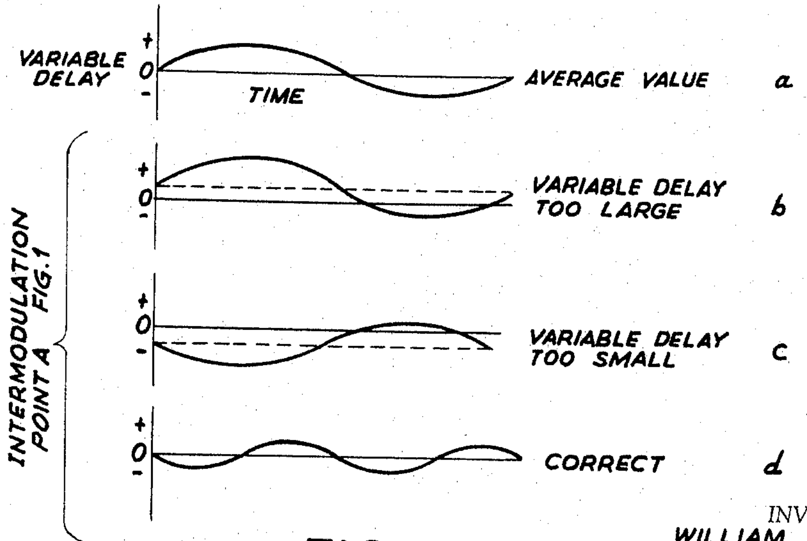

The intermodulation detector 42 in conjunction with respective filters 43 and 44 is included in the sensing means 62 and has outputs which provide the other signals for the respective detectors 40 and 46. Intermodulation detector 42 is filtered at 43 to obtain a component at $F_1$ which is applied to the phase detector 40 whose other input is obtained from oscillator 41. Referring to FIG. 3 for illustration, when the delay is too large a voltage of one polarity (say positive) is obtained over line 40′. This voltage increases the delay until the delay is at or near the correct setting (very small or no component at $F_1$ from the intermodulation detector). A negative voltage similarly decreases the delay. The attenuation variation control operates similarly, but at a frequency $F_2$.

A sinusoidal time variation is shown in FIG. 3*a* resulting from the use of oscillator 41 producing frequency $F_1$, but any time variation, including random, can be used. If the average delay is too large, the intermodulation will vary as shown in FIG. 3*b*. If the average delay is too small, intermodulation will vary as shown in FIG. 3*c*. When the delay setting is correct there will be no component at the frequency of delay variation as shown in FIG. 3*d* and there will be no corrective signal on line 40′.

The tagging principle is explained more fully in the invention of Robert T. Adams, S.N. 231,734 owned by the assignee of the application. Referring to FIG. 2, if the tag produced is FM, detectors 42 will be AM. The phase of the detected signal will be compared at detector 40. If the tag is AM, then detectors 42 are FM, but the phase of the detected signal is still compared at detector 40.

In the embodiment of FIG. 4, the inputs to the combiner (hybrid) 14 derived from the received signal or an IF thereof indicated at 11″ appear on lines 12′ and 16′. Their phase and frequency is insured by phase detector 50.

The main signal is applied to a mixer 53 having a VCO (variable control oscillator) 51 coupled thereto to provide a second IF signal. The auxiliary branch signal is applied to a similar mixer 54 having stable oscillator 55 coupled thereto to provide the auxiliary IF signal.

If the main signal over line 12′ and the auxiliary signal on line 16' are out of phase, a phase detector coupled between these lines varies the frequency of control oscillator 51 to vary the phase of the main signal on line 12'. A low pass filter 52 is connected to the output of the phase detector before the VCO. The output 60 is applied to the remaining circuitry in the receiver of conventional form and for purposes herein is termed generally a utilization circuit means. The delay need not be controlled very accurately and the variable attenuator can introduce a variable phase shift.

If the variable delay line can be accurately controlled, and if the variable attenuator has constant phase shift independent of setting, the simplified circuit shown in FIG. 5 can be used.

In the embodiment of FIG. 5, approximate cancellation is obtained by varying only the attenuation. The amount of cancellation is less accurate than in the other embodiments, but may be adequate for some applications. A fixed delay line 59 having a delay about one-half of the average equivalent single echo delay is placed in tandem with variable attenuator 61 controlled over line 46" from the detector 46. The output attenuator 61 is short-circuited in this embodiment to produce a frequency independent phase reversal. The reflected signal is thus added to the main signal at hybrid combiner 14 over a phase control means 70. The other circuit elements function as previously described.

The same principle can be applied to modulation other than FM or AM. It will also tend to reduce intermodulation produced by the frequency or phase modulator if the intermodulation is similar to that produced by a delayed echo.

The invention described above can be used before or after limiting in FM systems, and before or after predetection diversity combining.

In the diagrams the variable delay lines and attenuators are each fed with the known modulation and the correcting signal. If desired, separate units in cascade can be used, one controlled by the known modulation and the other by the correcting signal.

The cancelling methods described above work equally well when the "echo" arrives before the main signal. The major part of the intermodulation noise is proportional to the square of the echo delay, so that negative relative delays have the same effect as positive delays.

The corrected output will contain a small amount of the original intermodulation due to two causes: (1) the methods use one or more feedback loops. In practice the intermodulation is reduced by a large factor, but never removed completely; (2) the equivalent echo amplitude and delay have finite widths rather than definite values. For example, one delay line can match the average delay, but cannot match all significant delays. The first cause is common to all correcting systems and with proper design adequate correction is easily obtained. The second cause is the limitation due to the use of only one delay line. However, small errors due to not matching amplitudes and delays exactly do not cause serious errors. By using many delay lines and attenuators with each correcting a narrow range, much better correction can be obtained. Alternatively, for a given path the average spread can be determined, and the delay lines and attenuators controlled as a group.

These methods are suitable for small (less than about 0.2 radian) values of (a) the highest modulating frequency times the equivalent time delay, and (b) the peak frequency deviation times the equivalent time delay.

While I have described above the principles of my invention in connection with specific apparatus, it is to be clearly understood that this description is made only by way of example and not as a limitation to the scope of my invention as set forth in the objects thereof and in the accompanying claims.

I claim:

1. A process for receiving signals in which the transmitted signal effectively encounters multipath reflections to produce intermodulation distortion,
  said transmitted signal including at least one modulating information signal at preselected frequency,
  said reflections being approximated by a single time varying reflection of a time varying magnitude and delay with respect to the transmitted signal,
  comprising the steps of receiving said transmitted signal,
  delaying and attenuating said received signal in response to said single time varying reflection to provide a compensating signal,
  providing an applied identifying signal, controlled in accordance with the delay or attenuation of said received signal, to said compensating signal,
  and combining said compensating signal and said received signal to provide a composite output signal,
  determining the presence of said identifying signal in said composite output signal,
  comparing said applied identifying signal with the said determined output identifying signal to vary said delay or attenuating means to vary said compensating signal to the approximate value of said single time varying reflection.

2. The process of claim 1 in which the step of providing an applied identifying signal to said compensating signal comprises applying an FM modulating component to said compensating signal.

3. The process of claim 1 in which said received signal is delayed sufficiently to result in an effective equivalent time delay, and said delay is such that the highest modulating frequency multiplied by the equivalent time delay of the transmitted signal and the peak frequency deviation, times the equivalent time delay, is less than approximately 0.2 radians.

4. An apparatus for receiving signals in a troposcatter system in which the transmitted signal having an information component at a first frequency encounters multipath reflections to produce intermodulation distortion,
  said reflections being approximated by a single time varying reflection varying at a rate substantially lower than said first frequency,
  comprising means for receiving said transmitted signal,
  means for modifying said received signal in response to said single time varying reflection to provide a compensating signal,
  including delay and attenuation means, and means for applying at least one identifying modulation signal to said delay and attenuation means,
  and means for combining said compensating signal and said received signal to provide a composite output signal.

5. The apparatus of claim 4 including means connected to said means for modifying said received signal for imposing two distinct tagging frequencies to respectively identify the amount of delay and attenuation applied by said delay and attenuating means, each of which being variable,
  each of said tagging frequencies being greatly in excess of the time rate of change of said reflection.

6. The apparatus of claim 4 including a main branch circuit and an auxiliary branch circuit, said received signal being applied essentially to each of said branches,
  said signals in said branches being additively combined in said combiner,
  said auxiliary branch means including a fixed delay means of approximately one-half of the average equivalent delay,
  variable attenuating means coupled thereto,
  identifying frequency means applying identifying component to said attenuating means,
  means to sense said identifying component in the output of said combiner, and means to vary said variable attenuating means in accordance with a comparison between the output from said identifying frequency means and said sensing means.

7. An apparatus for receiving signals in a troposcatter system in which the transmitted signal encounters multipath reflections to produce intermodulation distortion, said reflections being approximated by a single time varying reflection of a time varying magnitude and delay with respect to the transmitted signal, comprising means for receiving said transmitted signal, means for delaying and attenuating said received signal in response to said single time varying reflection to provide a compensating signal, means for providing an applied identifying signal to said compensating signal, and means for combining said compensating signal and said received signal to provide a composite output signal.

8. The apparatus of claim 7 comprising means for controlling said applied identifying signal in accordance with the delay or attenuation, means for determining the presence of said identifying signal in said composite output signal, means connected to said means for providing an applied identifying signal and said means for delaying and attenuating said received signal for comparing said applied identifying signal with the said determined output identifying signal to vary said delay or attenuating means to vary said compensating signal to the approximate value of said single time varying reflection.

9. The apparatus of claim 8 in which said means for providing an applied identifying signal, comprises means for applying an FM modulating component to said compensating signal.

10. The apparatus of claim 7 wherein said means for delaying said received signal produces an equivalent time delay such that the highest modulating frequency multiplied by the equivalent time delay of the transmitted signal and the peak frequency deviation times the equivalent time delay, is less than approximately 0.2 radians.

11. The apparatus of claim 10 in which the mode of transmission is frequency modulation.

12. The apparatus of claim 7 in which said single time varying reflection may be represented by the equation:

$$A\ sin\ [wt+t \sin pt+am^2 \sin^2 (pT/2) \cos (2pt-pT)]$$

the undesired intermodulation signal being represented by the term of said equation constituting essentially:

$$am^2 \sin^2 (pT/2) \cos (2pt-pT)$$

and where said attenuating means and delay means vary so as to minimize the intermodulation signal represented by said term.

References Cited

UNITED STATES PATENTS 3,213,450 12/1965 Goor ---------- 325—476 XR

KATHLEEN H. CLAFFY, Primary Examiner

BARRY PAUL SMITH, Assistant Examiner

UNITED STATES PATENT OFFICE
CERTIFICATE OF CORRECTION

Patent No. 3,480,867 November 25, 1969

William Sichak

It is certified that error appears in the above identified patent and that said Letters Patent are hereby corrected as shown below:

Column 8, line 15, the portion of the equation reading "t sin pt" should read -- m sin pt --.

Signed and sealed this 14th day of April 1970.

(SEAL)
Attest:

Edward M. Fletcher, Jr.
Attesting Officer

WILLIAM E. SCHUYLER, JR.
Commissioner of Patents